(No Model.)

O. R. CHASE.
MIXING MACHINE.

No. 343,565. Patented June 15, 1886.

WITNESSES
Albert W. Spear
M. E. Parker

INVENTOR
Oliver R. Chase
by W. B. H. Dowse
his atty.

UNITED STATES PATENT OFFICE.

OLIVER R. CHASE, OF BOSTON, MASSACHUSETTS, ASSIGNOR TO CHASE & CO., OF SAME PLACE.

MIXING-MACHINE.

SPECIFICATION forming part of Letters Patent No. 343,565, dated June 15, 1886.

Application filed October 16, 1884. Serial No. 145,707. (No model.)

*To all whom it may concern:*

Be it known that I, OLIVER R. CHASE, a citizen of the United States, residing at Boston, in the county of Suffolk and Commonwealth of Massachusetts, have invented a new and useful Improvement in Mixing-Machines, of which the following is the specification.

The object of my invention is to provide a simple, cheap, and effective apparatus for mixing and kneading powders, pastes, and other light substances, and even denser materials; and it consists in the arrangement and construction of the parts as hereinafter described.

Figure 1:
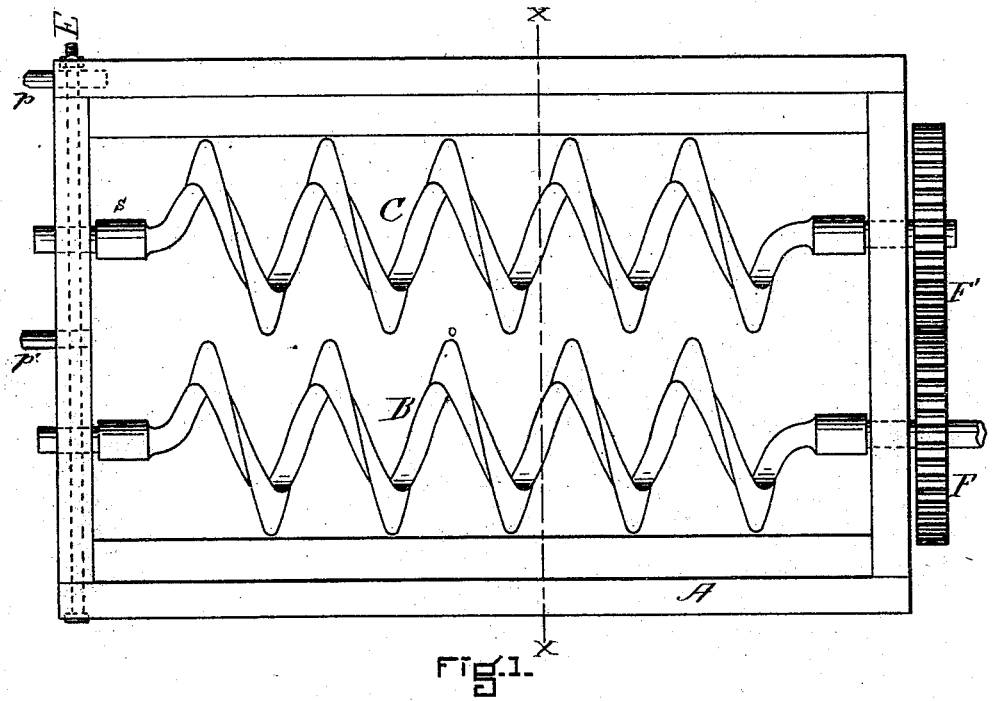
Figures 2, 4, 5:
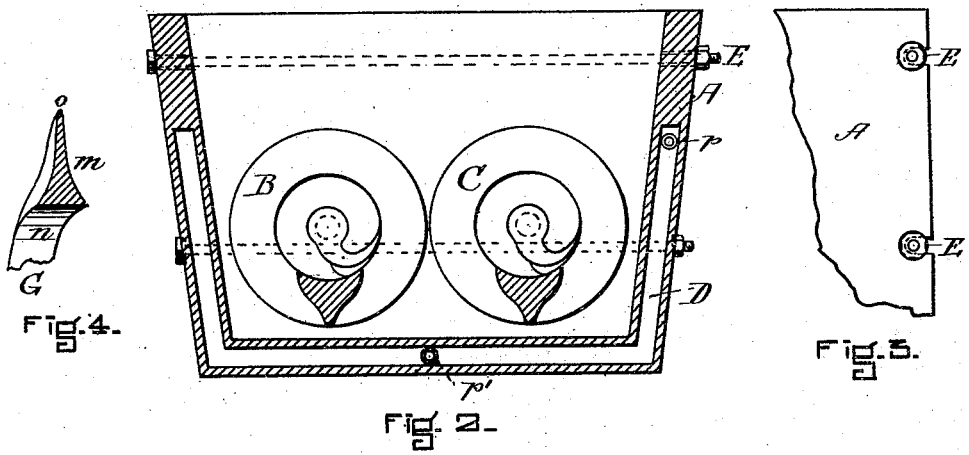

In the accompanying drawings, Figure 1 represents a perspective or top view of my improved apparatus; Fig. 2, a sectional view through the line $x\ x$ of the same; Fig. 3, a perspective view of one end of the tray or mixing-chamber broken off; Fig. 4, a sectional view of one of the spiral blades.

A denotes a box of any desired shape, preferably rectangular, open at the top, and of any capacity desired, in which the kneading or mixing takes place. This box can be supported by legs, or in any one of the well-known ways.

Within the interior, and journaled near the bottom of the box, I place two right-handed spiral blades, C and B, which I make triangular in shape, as shown in Fig. 4, where G represents a cross-section of the blade, which is flat on its inner side at $n$, and tapers with concave sides, as shown at $m$, to a sharp edge at $o$. These blades or screws may be made of any suitable material, but preferably they are cast in a single piece of metal and terminate with journals, as shown, which are supported in the ends of the tray in bearings sufficiently high above the bottom of the box to allow the blades to revolve. Each of these blades or screws has affixed to one of its journals extending through the end of the trough A a spur-gear, F F', which engage with each other. One of the journals extends beyond the end of the trough and is provided with a crank or pulley, to which motion may be imparted from the prime motor. One end of the trough is made removable, and when in position is held in place by the bolts and nuts E, as shown. The blades or screws are first placed in position in the trough or mixing-chamber, and then the end is securely bolted in position.

D is a hot-water jacket or steam-jacket which extends along the bottom of the trough and as far up the sides of the same as the top of the blades or screws.

$p$ is the inlet, and $p'$ the outlet, of this jacket.

Right-handed blades or screws are shown; but I can use and effect the same result with two left-handed screws or blades.

In order to obtain the results described in this specification, it is necessary to use either two right or two left handed screws. The gears on the journals of the two screws are arranged to turn toward each other and the center of the trough.

The materials to be mixed having been placed in the trough and the apparatus set in motion, the action of the blades, when arranged and operated as I have described, on the powder or paste is twofold, so that while the different direction in which each screw is moving impels the mass with it in opposite directions toward each end of the trough, yet, from the fact that both screws are turning at the same time inwardly, there is a constant tendency for the paste to be thrown from the center of the screw to the center of the trough, producing a braiding or kneading action, for the paste as it comes to the sharp end of the blade, as at $o$ in Fig. 4, is caught and cut off by the other screw when their edges come together, as is constantly the case. Such portions of the paste as moving with the screw reach the end of the trough are impeded by it are thrown upward by the peculiar shape of the blade, (which is attenuated to a point even on that part of the journal which is marked S,) and fall within the action of the other screw. It will be thus seen that an intertwisting or braiding takes place constantly from one end of the trough to the other, and that the material is at the same time moved from one end of the trough to the other. Any materials placed within the action to the blades are sure to be thoroughly mixed, kneaded, and aerated.

I am aware that it is old to use in a stirring or mixing apparatus two or more spiral rods or bolts, one spiral rod being left-handed and the other right-handed, so as simply to produce separate currents in the mixing-chamber; and therefore I do not broadly claim as my invention the combination of two or more spiral rods or bars arranged to produce separate currents. A right and left handed screw both moving toward the center of the mixing-chamber throw the paste wholly to one end of the chamber, where it has a tendency to clog the machine. A right and left screw geared so as to produce a current in a rope-like mass laterally around the mixing-chamber will not produce any braiding or mixing.

The jacket which I use in connection with the mixing-chamber enables me to operate the apparatus while the materials to be mixed are at any desired temperature.

The peculiar shape of the screw, as shown in section at Fig. 4, is of a very strong and useful form for the work desired of it. It is essential that the outer edge of the blade be attenuated to a point that it may easily penetrate or cut the material with which it comes in contact, and it also allows the paste or substance being mixed to easily disengage itself in its tendency to pass from one screw to the other in the process described of kneading or braiding.

I do not claim, broadly, the combination of two spiral mixers, as I am aware that such a combination is old.

What I claim, and desire to secure by Letters Patent, is—

In a mixing or kneading machine, the combination of two spiral mixers of the same kind, being in cross-section triangular in shape—that is, flat on their inner side and tapering with concave sides to their outer edge—said mixers being geared to turn toward each other and the center of the trough, substantially as described.

In witness whereof I have hereunto set my hand.

OLIVER R. CHASE.

Witnesses:
WM. B. H. DOWSE,
M. E. PARKER.